UNITED STATES PATENT OFFICE.

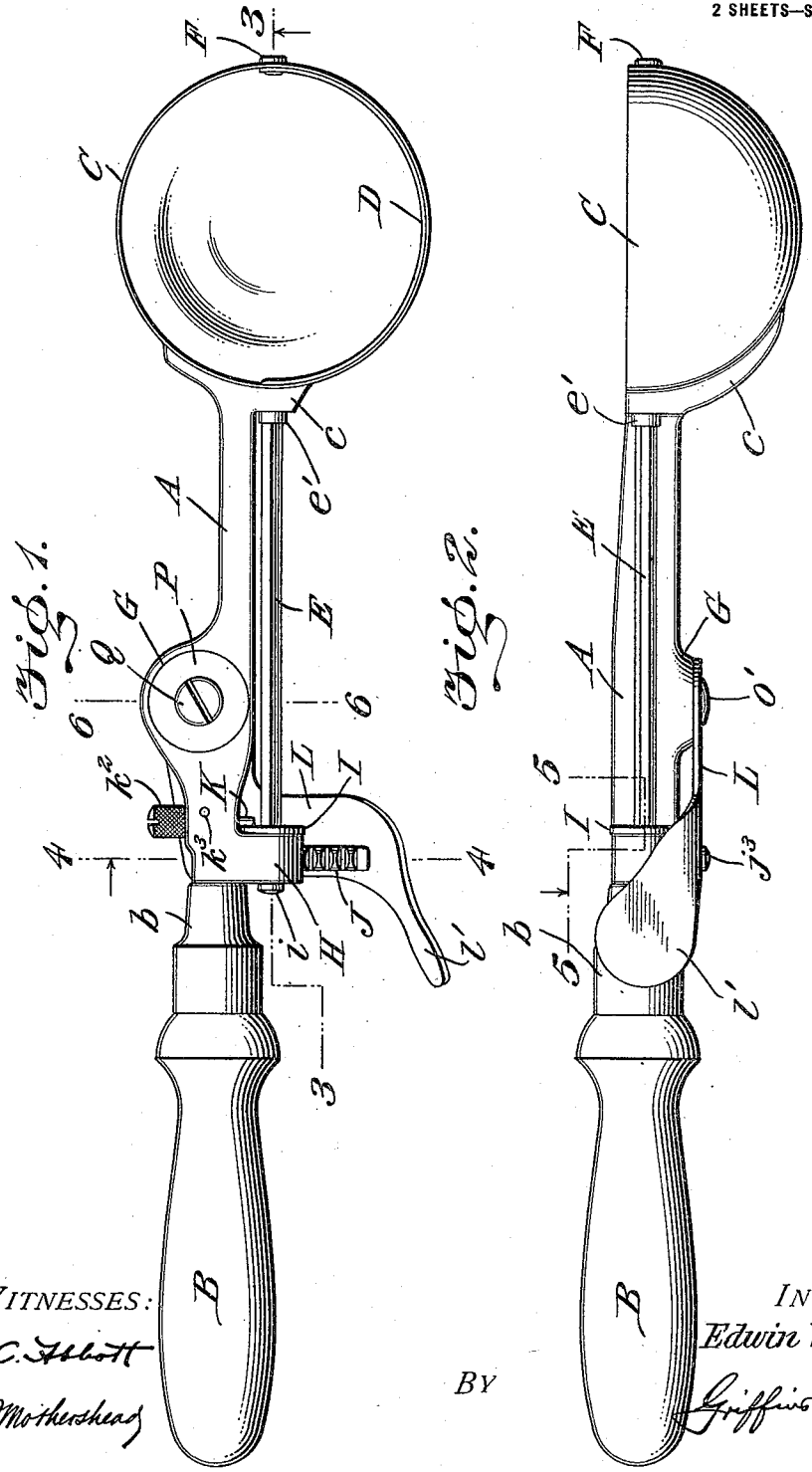

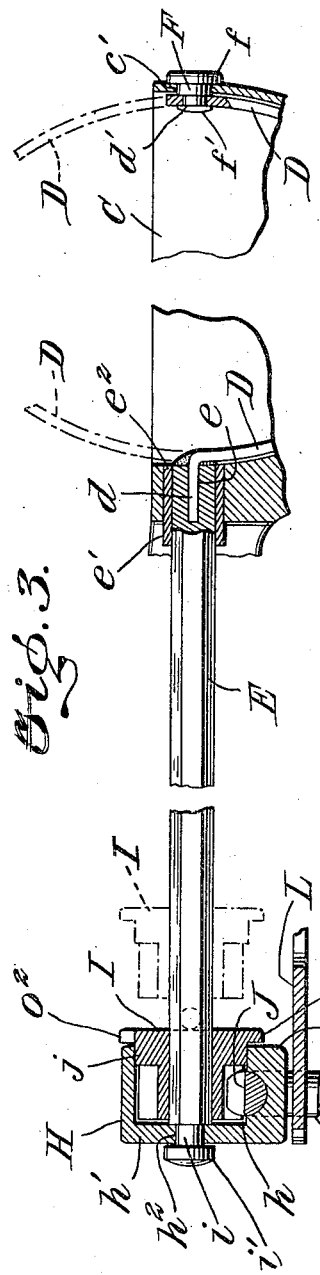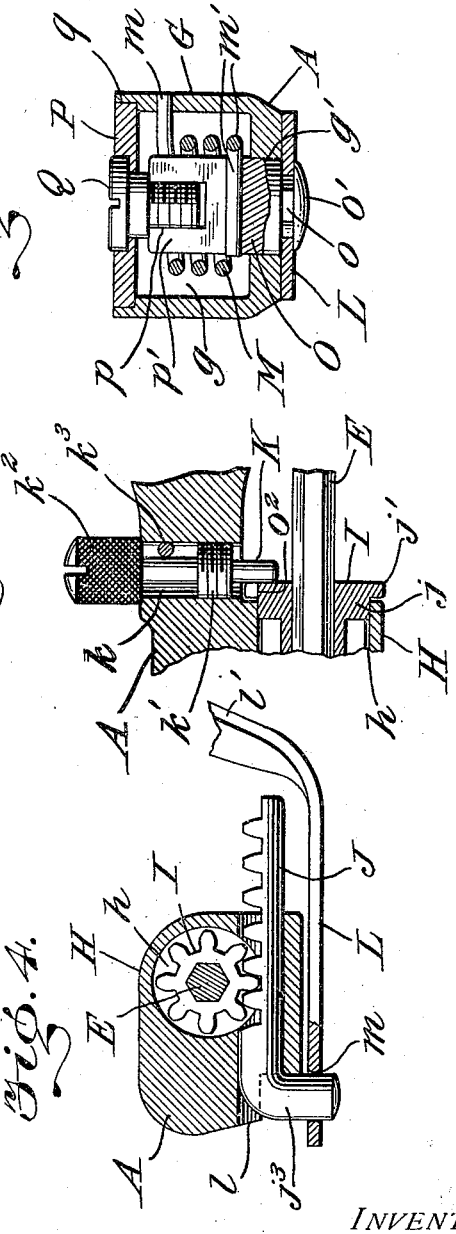

EDWIN WALKER, OF ERIE, PENNSYLVANIA.

ICE-CREAM DISHER.

1,138,706.  Specification of Letters Patent.  Patented May 11, 1915.

Application filed November 3, 1911. Serial No. 658,305.

*To all whom it may concern:*

Be it known that I, EDWIN WALKER, a citizen of the United States, residing in the city of Erie, county of Erie, and State of Pennsylvania, have invented a certain new and useful Ice-Cream Disher, of which the following is a specification.

This invention is an ice cream disher of simple and efficient construction and possessing pronounced sanitary advantages.

Heretofore it has been common to make the scrapers of ice cream dishers removable, in order to permit of the thorough cleansing of the bowl and the scraper. The mechanism which permitted such removability was more or less complicated, and, in many instances, came in contact with the cream during the use of the disher. Moreover, many persons using such dishers, not being at all familiar with mechanical devices, found much trouble and difficulty in properly replacing the detached scraper.

The present invention obviates the disadvantages in the scrapers of the type specified, and possesses pronounced advantages over any of them. To this end, the invention embodies an ice cream disher wherein the scraper may be moved to a position outside the bowl without detaching the scraper from the bowl, and yet permit the scraper and the bowl to be thoroughly cleansed. Moreover, the mechanism which permits the operation of the scraper as herein described, is of an extremely simple character, and positioned near the handle of the disher so that it does not come in contact with the cream.

A further feature of the invention, wherein it is fundamentally differentiated from prior ice cream dishers, consists in a scraper which, in addition to being operable as described, is so locked in the bowl as to preclude its detachment therefrom, by springing out or otherwise.

Further features and advantages of the invention will appear in the course of the annexed description taken in connection with the drawings.

In the accompanying drawings, I have illustrated one practical embodiment of the invention, but the construction shown therein is to be understood as illustrative, only, and not as defining the limits of the invention.

Figure 1 is a plan view of an ice cream disher embodying my invention. Fig. 2 is an elevation of the disher looking toward the right hand side of Fig. 1. Fig. 3 is a longitudinal section partly in elevation, the bowl or cup and a part of the sweep or scraper being broken away, the plane of the section being indicated by the dotted line 3—3 of Fig. 1. Fig. 4 is a vertical cross section on the line 4—4 of Fig. 1. Fig. 5 is a detail section on the line 5—5 of Fig. 2 illustrating the means for retaining a shiftable gear in mesh with a rack, whereby the operating mechanism for the sweep or scraper may be adjusted, for the purpose of permitting said sweep or scraper to be turned into an exposed position externally with respect to the bowl or cup. Fig. 6 is a vertical cross section on the line 6—6 of Fig. 1 illustrating, more particularly, the means for housing a spring, and for operatively connecting said spring with the finger lever, by the operation of which movement is imparted to the sweep or scraper.

A designates a frame or bar provided at one end with a handle B, the connection between the handle and the frame or bar being reinforced by a ferrule *b*.

Secured rigidly to the opposite end of bar or frame A is a cup or bowl C, the latter being preferably composed of a single piece of metal and made separate from the frame or bar. The cup or bowl is attached in any suitable way to the bar, but it is preferred to provide said bar with a face plate *c* at one end thereof, whereby the cup or bowl may be united in a substantial way to the end portion of the bar. As shown more particularly in Fig. 2, the cup is united to the bar in a way to bring the edge of the cup at the open side thereof substantially flush with one edge of bar A, whereby the open side of the cup and one edge of the bar are substantially in the same horizontal plane.

D designates a sweep or scraper which is positioned within the cup or bowl, the respective end portions of the sweep or scraper being pivotally supported, so that the axis of movement of the sweep or scraper is coincident substantially with the axis of the cup or bowl. A salient feature of the invention consists in so supporting the sweep or scraper that it can not be removed accidentally, or otherwise, from the bowl, although the operating mechanism for the sweep or scraper is arranged to permit the sweep or scraper to be adjusted substantially through the open side of the cup and externally thereto, as indicated in dotted lines in Fig. 3, whereby the sweep is exposed for substantially its length outside of the cup, in order that free and easy access may be obtained to said sweep, for the purpose of thoroughly cleaning it. At one end the sweep is provided with a short arm or shank $d$, and at the other end a perforation or aperture $d'$ is formed in the sweep. The shank or arm is received into a recess or socket $e$, the latter being provided in an end portion of an operating shaft E. The connection between the sweep arm $d$ and operating shaft E is such as to rigidly attach the sweep to the shaft for the purpose of securing a movement of the sweep with the shaft, and said shaft is mounted in the device or implement in such manner that said shaft serves to pivotally support one end portion of the sweep. According to this invention, the shaft is angular or polygonal in cross section, one end portion of the shaft being provided with a bushing $e'$, which bushing surrounds that part of the shaft to which shank $d$ is secured, whereby the bushing is adapted to be received in aperture $e^2$ formed in a wall of cup or bowl C. The bushing is angular or polygonal internally to conform to the cross sectional contour of the shaft, but externally the bushing is cylindrical so that it is free to turn in aperture $e^2$ of the cup.

The end portion of sweep or scraper D which is provided with aperture $d'$, is pivotally supported in the cup or bowl by pintle F. This pintle passes through an aperture $c'$ which is formed in a wall of the cup opposite to, and in alinement with, aperture $e^2$, said pintle being provided with a head $f$ and being upset or riveted at $f'$. The pintle passes through apertures $c'$, $d'$ in the cup and scraper, respectively, so that the headed end $f$ of the pintle will engage with the outside of the cup, the end $f'$ of the pintle being upset or riveted against the scraper, as shown clearly in Fig. 3. The pintle F constitutes a pivotal connection between the scraper and the cup, so as to permanently unite the parts and to preclude any separation of the scraper from the cup, but, at the same time, the scraper is free to swing within the cup on an axis afforded by pintle F and bushing $e'$.

Shaft E extends lengthwise of frame A, and it is positioned at one side of said frame, said shaft being disposed intermediate the top and bottom edges of frame A, as clearly shown in Figs. 2 and 3. This relation of the shaft to the frame is quite desirable from a practical standpoint, for the reason that the frame operates to protect the shaft from injury to a substantial extent. It is well known in the trade that operators frequently strike the device against the edge or side of a can in removing cream therefrom, but in my implement, the parts are so arranged that frame A will receive the blows and shock due to striking the implement against the can, thus preventing the shaft E from becoming injured when striking the device against a solid object in order to dislodge cream from the bowl or cup or other part of the implement.

Frame A is enlarged intermediate its ends, as at G, and said frame is furthermore provided, adjacent to the enlargement, with a boss or lug H. Said boss or lug is provided with a chamber $h$, one side of which chamber is open, but the other side thereof is closed by a wall $h'$. Said wall of the chamber is formed with an aperture $h^2$ which is in alinement with the aperture $e^2$ of the cup. Shaft E extends through the chamber $h$ of the boss or lug, as shown in Figs. 1 and 3, the end portion of said shaft being provided with a journal $i$ and a head $i'$, see Fig. 3. The journal $i$ of the shaft is fitted in aperture $h^2$ of the boss or lug so as to turn freely therein, but the head $i'$ of the shaft is positioned externally to wall $h$ of the boss, for the purpose of retaining the shaft against endwise movement in one direction relative to the boss, the frame, and the cup. After the parts shall have been assembled, head $i'$ is formed on an end portion of shaft E by upsetting the metal, and thus shaft E is precluded from longitudinal displacement in one direction by head $i'$ engaging externally with lug or boss H and said shaft is precluded from longitudinal movement in an opposite direction by the scraper D, the latter being attached to the opposite end from head $i'$, all as will be readily understood.

I designates a gear which is provided with a polygonal opening corresponding to the cross section of shaft E, said gear being fitted on said shaft for rotation therewith and the gear being slidable on the shaft, whereby the gear may be moved into mesh with a rack J, or it may be adjusted out of mesh with said rack. The gear is provided, also, with a shoulder $j$ and a flange $j'$, see Figs. 3 and 5. In the operative position of the gear, it lies within chamber $h$ of boss or lug H, the shoulder $j$ of said gear fitting in the open side of the chamber, and the flange $j'$ being in contact with the edge of boss or lug H at said open side thereof, whereby said gear operates to close said open side of the chamber, see Fig. 3. The gear is retained in its operative position by any suitable form of means, one retaining means being illustrated, more particularly, in Fig. 5. As shown, the retaining means is a pin K extending through an opening $k$ provided in frame A, said pin being provided with an enlarged shoulder $k'$, which shoulder is externally threaded, so that the pin may be screwed into an internally threaded part of opening $k$. The pin extends outside of the frame and is provided with a milled head or thumb piece $k^2$, for the purpose of rotating the pin in a manner to adjust its other end into the path of gear I, or to withdraw the pin from engagement with said gear, thus permitting the gear to be shifted in a direction lengthwise of shaft E and out of engagement with rack J. The pin is kept in position in the aperture of the frame by a stop pin $k^3$, the latter being secured in the frame so as to extend across opening $k$ and said stop pin being positioned between the threaded shoulder $k'$ and the head $k^2$ of the retaining pin. The stop pin precludes the retaining pin from becoming separated accidentally from the frame, but there is sufficient space between shoulder $k'$ and head $k^2$ for the pin to be adjusted into and out of the path of the gear.

Rack J coöperates with a finger lever L, which lever is pivoted on the frame by novel means, to be hereinafter described, and said finger lever and the rack are adapted to be operated by hand in one direction, for the purpose of turning gear I and shaft E, so as to swing the sweep or scraper from one side of the bowl to the other side thereof.

Extending through the frame and the lug or boss H is a passage $l$, the axis of said passage being at a right angle to the axis of shaft E. Within this passage is positioned a part of rack J, said rack being at one side of gear I and the teeth of said rack meshing with the teeth of the gear when the latter is in an operative position.

Finger lever L is composed, preferably, of sheet metal, the same being stamped from a single piece of metal and bent to the required form. This finger lever is angular in shape, as shown in Fig. 1, and it is provided at one end with a bent pressure piece $l'$. The finger lever lies opposite to the frame, the lug H thereon, and the rack J, so that the finger lever operates in a way to house or conceal the rack, the end of said rack terminating within the bent pressure piece $l'$. The finger lever is fulcrumed at one end to the enlarged part G of the frame, and to the angle or knee of said finger lever is pivotally connected one end portion of the rack. As shown in Fig. 4, the rack is bent at one end so as to produce a pivot $j^3$, and this bent pivotal end is fitted loosely in an aperture $m$ provided in the angle or knee portion of the finger lever. The rack J is thus connected pivotally to the finger lever so as to be operated by the movement of said lever. As the lever swings in one direction or the other on its fulcrum, the pivot $j^3$ of the rack turns loosely in the aperture $m$ of the lever, thus enabling the rack to swing in an arc of a circle when the lever is operated. The swinging movement of the rack takes place within the passage $l$ of the frame, for the reason that this passage is made sufficiently large for the rack to slide and to swing therein, although the passage $l$ serves as a means for retaining the rack in an operative relation to the finger lever.

Enlargement G of frame A is hollow, as shown in Fig. 6, thus producing a chamber $g$ within which is housed a spring M. This spring coöperates with lever L through the medium of a pivot post O, the latter acting to pivotally attach the finger lever to the frame. The pivot post is circular in cross section, and it finds a bearing in aperture $g'$ of frame A, said aperture being positioned at the bottom of chambered enlargement G of said frame. The pivot post is provided with a square or polygonal stud $o$ which fits in a corresponding aperture provided in an end portion of lever L, and after fitting said stud in the aperture of the lever, the end portion of post O is upset or headed at $o'$ against the outside of the lever, see Fig. 6, whereby the pivot post is attached rigidly to the lever. The end portion of the lever to which the pivot post is attached is applied sidewise against frame A so that the pivot post will pass through aperture $g'$ and into the chamber of enlargement G. The pivot post is provided with a socket $p$, the same being internally threaded, and is bifurcated at its free end to form a slot $p'$ which extends through the pivot post from side to side thereof, said slot intersecting the socket, see Fig. 6.

Spring M is coiled loosely around the pivot post, said spring being provided at one end with an arm $m$ which is attached to a wall of enlargement G, the other end of said spring being provided with an arm $m'$, the latter extending loosely through the transverse slot $p'$ of the pivot post. The described construction enables the lever, the pivot post and the spring to be easily placed in position or assembled so that the tension of the spring will be applied to the pivot post and the lever.

The chamber $g$ opens through the enlargement at one side of the frame, and this open side is closed by a cap P, the latter being fitted within a recess $q$ which is provided in the enlargement, whereby the cap is positioned in substantially flush relation with the frame, see Fig. 6. The cap is retained in position by a screw Q, the shank of which screw is threaded into engagement with the wall of socket $p$ in the pivot post O, the head of the screw being countersunk in the cap. The screw operates to retain the cap in position on the enlargement of the frame, but this screw may be removed and the cap taken out of the frame so that access can be had easily to the spring. Obviously, the lever and the pivot post may be withdrawn from the chamber of the enlargement, the arm $m'$ of the spring sliding out of the slot $p'$ in the pivot post when said pivot post is withdrawn from the enlargement.

The operation of the invention will be apparent from the foregoing description taken in connection with the drawings, but it may be summarized briefly as follows:— The device is operated to scoop the cream, or other substance, into the cup or receptacle C, and the device is then turned over a dish or other receptacle. The operator exerts pressure upon the thumb-piece $l'$ of the lever, thereby imparting movement to rack J which rotates gear I and shaft E, the latter acting to swing the scraper from one side of the cream receptacle to the other side thereof. The cream is thus released from the wall of the receptacle, and it drops into the dish. When pressure is removed from the finger lever, spring M acts on the pivot post to return said lever to a normal position, whereupon the rack and gear operate the shaft to return the scraper to its normal position within the cup, as shown in Fig. 1. For the purpose of cleaning the scraper and the inner surface of the cup, retaining pin K is rotated in the frame until shoulder $k'$ engages stop pin $k^3$, whereupon the end of the retaining pin is withdrawn from the path of pinion I. The pinion may now be shifted lengthwise of shaft E and out of mesh with rack J, whereupon shaft E or scraper D may be turned for the purpose of moving the scraper to a position outside the cream receptacle, as shown in dotted lines in Fig. 3. This adjustment of the scraper exposes the surface of the scraper and the inner surface of the cream receptacle to access, so that all the surfaces may be thoroughly and expeditiously cleaned. After the parts shall have been cleaned as described, the scraper is adjusted by hand to a position within the cup, substantially flush with the edge of said cup at the open side thereof, after which the pinion is moved along the shaft until it meshes with the rack and then the retaining pin K is adjusted to the position of Fig. 5 for the purpose of precluding movement of the pinion in a direction to disengage it from the rack.

In the present invention the scraper is not detachable from the cup, but, contrawise, said scraper is pivotally mounted within the cup in such a manner as to remain practically a fixture therein, that is to say, the scraper is fitted to the cup by means which precludes its removal therefrom. Again, the pivotal connection of the scraper to the cup and the operating means for the scraper are so organized that the scraper can be adjusted outside of the cup, for the purpose of exposing the surfaces of the scraper and the surface of the cup to ready access when it is desired to clean the parts in order to keep the disher in a sanitary condition. In prior dishers of this kind, one end of the scraper is loosely held in the cup. This is seriously objectionable for the reason that in forcing the disher into hard cream, or in dislodging the cream from the cup, the end of the scraper becomes disconnected from the cup, the result of which is that the scraper becomes twisted off the scraper-operating shaft. My disher obviates this difficulty, for the reason that the end of the scraper is connected in practically a permanent manner to the cup, thus precluding any tendency for the scraper to become displaced when forcing it into hard cream or when it is rotated to dislodge the cream.

In the drawings there is shown means for precluding the gear from being adjusted into mesh with the rack when the scraper does not occupy a proper position relative to the cup. The means shown consists of a notch $o^2$, in the rim of the flange $J'$ on the gear, said notch being adapted to receive the end of the retaining pin when sliding the gear on the shaft. After the gear is moved along the shaft to a position free from the rack, the scraper may be swung outside of the bowl, for cleaning purposes as described, but when the scraper is to be restored to a position within the bowl, some users may be so careless as to attempt to restore the scraper without respect to the proper engagement of the gear with the rack. The notch in the gear obviates this objection, for the reason that the gear must be turned to a position where the retaining pin will pass through the notch when moving the gear into mesh with the rack, and this adjustment results in the scraper being properly positioned within the cup.

Having thus fully described the invention, what I claim as new, and desire to secure by Letters Patent is:—

1. In an ice cream disher, the combination of a cream receptacle, a scraper operable therein, operating means for normally imparting a traversing movement to the scraper within the confines of the receptacle only, and mechanism coöperating with said operating means for releasing the scraper whereby it may be rotated to a position outside the cream receptacle and thus allow the receptacle and scraper to be readily cleansed without detaching the scraper from the receptacle.

2. In an ice cream disher, the combination of a cream recepatcle, a scraper permanently secured thereto and operable therein, operating means for imparting a traversing movement to the scraper within the confines of the receptacle, and means for rendering the operating means ineffective and for releasing the scraper whereby said scraper may be moved to a position outside of the cream receptacle while the same is fixedly secured thereto, said means being normally adapted to preclude the movement of the scraper exteriorly of the receptacle.

3. In an ice cream disher, a cream receptacle provided with a non-detachable scraper adapted to be moved to a position outside said cream receptacle, in combination with operating means for imparting a traversing movement to the scraper within the confines of the receptacle only, and a shiftable member coöperating with the operating means for maintaining the parts thereof in operative relation, said shiftable member being movable to release the scraper from its coöperative action with its operating means, whereby said scraper may be moved to a position external of the receptacle to allow of the cleansing thereof while said scraper remains permanently secured to the receptacle.

4. In an ice cream disher, the combination of a cream receptacle, a scraper adapted to operate therein and to be moved to a position outside of the receptacle without detaching it from said receptacle, a shaft for operating the scraper, operating means for imparting a traversing movement to the scraper within the limits of the receptacle only, during the normal operation of the scraper, and means operable to release the scraper from the coöperative action of its operating means, whereby it may be moved to a position external of the receptacle, while its operating shaft remains in its operative position, for the purpose of allowing of proper cleansing of the receptacle and scraper.

5. In an ice cream disher, the combination of a cream receptacle, a scraper pivotally secured permanently to the receptacle near the open side thereof, operating means coöperating with the scraper for imparting a traversing movement thereto within the limits of said receptacle only, during the normal operation of the scraper, and means for releasing the scraper from its operating means, said scraper being capable, when released, of movement into a position outside of the receptacle for the purpose of allowing of proper cleansing of the receptacle and the scraper, while the latter is maintained in permanent engagement with the receptacle.

6. In an ice cream disher, a cream receptacle, a scraper pivotally secured to the receptacle, a shaft for rotating the scraper, a gear on said shaft, and a lever provided with a rack for operating said gear, said gear being slidable on the shaft so as to move it out of mesh with the rack, whereby the scraper operating mechanism is rendered ineffective and the scraper may thereafter be swung to a position outside of the receptacle, while remaining securely attached thereto.

7. In an ice cream disher, the combination of a frame, a cream receptacle carried thereby, a scraper operable within the receptacle, a shaft for operating the scraper, said scraper being rigidly attached, at one of its ends, to the shaft, and the other end of the scraper having a permanent pivotal connection with the receptacle, a pinion slidably mounted on said shaft, a lever, a rack pivotally mounted on the lever and adapted to mesh with said pinion, and means for detachably maintaining the pinion in engagement with the rack.

8. In an ice cream disher, a frame, a cream receptacle carried thereby, a scraper operable therein, a lever, a pivot post attached to the lever, said pivot post being bifurcated at its end, a spring adapted to place the lever under tension, one end of said spring being connected to the frame and the other end being passed through the bifurcation of the pivot post, and means operable by the lever for moving the scraper, said post being withdrawable from engagement with the spring by sliding the post lengthwise while the spring remains attached to the frame.

9. In an ice cream disher, a receptacle, a frame, a shaft extending lengthwise of the frame, said shaft being mounted to remain in non-detachable relation to the frame, a scraper connected to the shaft and pivotally supported in the bowl, a lever, a rack operated by the lever, a gear meshing with the rack and carried by the shaft, said gear being movable out of mesh with the rack, and means coöperating with the gear for retaining it in mesh with the rack.

10. In an ice cream disher, a frame, a receptacle thereon, a scraper, a shaft for operating the scraper, a rack, said scraper having a pivotal connection with the cup independent of the shaft, a gear carried by the shaft and meshing with the rack, said gear being shiftable out of mesh with the rack, a stop device independent of the scraper shaft for retaining the gear in mesh with the rack, and means for operating said rack.

11. In an ice cream disher, the combination of a receptacle, a scraper supported on the receptacle for movement therein, means for actuating the scraper, adjustable means for limiting the normal operation of the scraper to movement within the receptacle, said adjustable means being also operable to allow of the movement of the scraper to a position external of the receptacle while said scraper is supported on the receptacle.

12. In an ice cream disher, a frame, a receptacle thereon, a shaft extending lengthwise of the frame and positioned to be protected thereby from blows upon the disher, a scraper operated by the shaft, said scraper having a permanent pivotal connection with the cup independently of said shaft, a lever, a rack and pinion intermediate the lever and the shaft, said rack and pinion being so related as to permit an adjustment of one part relative to the other part without disturbing the position of the shaft, whereby the pinion may be disengaged from the rack, and means separate from the shaft for retaining the rack and pinion in mesh with each other.

13. In an ice cream disher, a frame, a receptacle thereon, a shaft, a scraper attached to said shaft, a pivot attached to the receptacle so as to be non-detachable therefrom, said pivot being fixed to the scraper, a lever, operating mechanism positioned intermediate the lever and the shaft, and means for rendering the same ineffective and for permitting the scraper to be adjusted to a position external with respect to the receptacle, while said scraper remains attached thereto.

14. In an ice cream disher, the combination of a frame provided with a chambered lug which extends outwardly from one side thereof, a lever mounted on the frame, a rotatable shaft extending lengthwise of the frame and through the chamber of said lug, a rack coöperating with the lever and pivotally secured thereto, said rack being guided for movement transversely of the shaft, a gear on the shaft meshing with the rack whereby movement of the rack transmits rotary motion to the shaft, said gear being substantially housed within the chambered lug, a cream receptacle on the frame, and a scraper operated by the rotation of said shaft.

15. In an ice cream disher, a frame provided intermediate its ends with a spring-containing chamber, a receptacle on the frame, a scraper, a lever fitted against one side of the chambered part of the frame, a bifurcated post secured to the lever and positioned within the chamber, a spring coiled around the post, said spring having one end thereof held within the bifurcated portion of the post, a rotatable shaft extending lengthwise of the frame and attached at one end to the scraper, a gear positioned on the shaft, and a rack positioned transversely to the shaft, said rack meshing with the gear and having a pivotal connection with the lever.

16. In an ice cream disher, a frame, a cup thereon, a scraper-shaft provided with a scraper, a rack and pinion for operating the scraper-shaft, said pinion being undetachable from the shaft but movable along said shaft to a position disconnected from the rack and means for precluding the restoring of the gear into mesh with the rack except when the scraper is properly positioned within the cup.

In testimony whereof I have signed my name to this specification in the presence of two subscribing witnesses.

EDWIN WALKER.

Witnesses:
H. I. BERNHARD.
J. F. MOTHERSHEAD.

Copies of this patent may be obtained for five cents each, by addressing the "Commissioner of Patents, Washington. D. C."